United States Patent [19]

Tollett et al.

[11] 4,258,031

[45] Mar. 24, 1981

[54] FEED COMPOSITION CONTAINING RONNEL AND ANTIBIOTIC A3823 COMPLEX AND USE THEREOF

[75] Inventors: James T. Tollett; Donald R. Fletcher, both of Lake Jackson, Tex.

[73] Assignee: The Dow Chemical Company, Midland, Mich.

[21] Appl. No.: 77,697

[22] Filed: Sep. 21, 1979

Related U.S. Application Data

[63] Continuation of Ser. No. 928,120, Jul. 26, 1978, abandoned, which is a continuation-in-part of Ser. No. 774,299, Mar. 4, 1977, abandoned.

[51] Int. Cl.³ ............................................. A61K 35/00
[52] U.S. Cl. .................................................... 424/115
[58] Field of Search .............................. 424/115, 283

[56] References Cited

U.S. PATENT DOCUMENTS

| | | | |
|---|---|---|---|
| 2,811,480 | 10/1957 | Norris, Jr. et al. | 424/220 |
| 3,501,568 | 3/1970 | Haney et al. | 424/115 |
| 3,839,557 | 10/1974 | Raun | 424/115 |

OTHER PUBLICATIONS

Chemical Abstracts, vol. 83 (1975) p. 108290x.
Chemical Abstracts, vol. 64 (1966) pp. 8085h–8086a.
Chemical Abstracts, vol. 65 (1966) p. 13762a.

*Primary Examiner*—Frederick E. Waddell

[57] ABSTRACT

On feeding both of the antibiotic A3823 complex monensin and the phosphate ester ronnel, i.e., 0,0-dimethyl 0-(2,4,5-trichlorophenyl)phosphorothioate, to livestock and poultry selected from cloven hoof ruminant animals, swine and poultry substantially every day for at least about 3 to about 28 days depending on the animal, and more preferably for a longer period through growth and/or fattening feeding cycles or during maintenance periods, in respective amounts in an effective amount in the range of about 0.14 to about 2.3 milligrams of the antibiotic and about 0.5 to about 4 milligrams of ronnel per kilogram (mg/kg) of body weight per day, the growth of the livestock and poultry takes place at an increased rate; fiber production, such as wool in sheep, is increased; the production of milk in lactating animals is increased; and, in particular, the feed conversion efficiency of the animal is markedly improved compared to the response obtained on providing either of the antibiotic or ronnel alone. The antibiotic and ronnel are provided for oral ingestion by the animal on a voluntary basis upon incorporating sufficient antibiotic and ronnel into a balanced feed diet or a component thereof to provide about 0.14 to about 2.3 mg of antibiotic in addition to about 0.5 to about 4 mg of ronnel per kg of body weight per animal per day on average and substantially every day during the period of nutritional response promotion treatment, prepared feeds typically containing from about 5 to about 100 grams of antibiotic and about 3 to about 200 grams of ronnel per ton of feed (dry matter basis). For range-fed animals, the antibiotic and ronnel are conveniently incorporated in a mineral, protein or energy type feed additive supplement.

Ronnel in the described combination may be replaced in part or entirely, mol for mol, by either of the close analogs bromophos or iodofenphos or a mixture thereof.

20 Claims, No Drawings

FEED COMPOSITION CONTAINING RONNEL AND ANTIBIOTIC A3823 COMPLEX AND USE THEREOF

CROSS REFERENCE TO RELATED APPLICATION

This application is a continuation of application Ser. No. 928,120, filed July 26, 1978, and now abandoned, which is in turn a continuation in part of our copending application Ser. No. 774,299, filed Mar. 4, 1977, and now abandoned.

BACKGROUND OF THE INVENTION

1. Field of the Invention

The invention relates to a method of promoting the growth, increasing milk and fiber production and improving the feed conversion efficiency, of livestock and poultry selected from cloven hoof ruminant animals such as cattle and sheep, swine, and poultry such as chickens, by introducing into the daily diet, or ration, of the animals, and in combination, or at least concurrently, the growth promoting substances antibiotic A3823 complex monensin, and, one of ronnel or bromophos or iodofenphos. The invention further relates to the feed or feed additive supplement and feed additive premix compositions containing the growth promoting substances used in said method.

The invention more particularly relates to the use of ronnel or bromophos or iodofenphos to overcome the depressed feed intake previously observed upon the administration of the antibiotic monensin to livestock and poultry.

The invention then relates to the use of said antibiotic and one of said phosphate esters in combination as synergistic growth promotants, to feed compositions and feed additive supplement compositions, including growing mash for poultry, containing both the antibiotic and phosphate ester at appropriate dosage levels to be used in said method, and, to feed additive premixes and feed additive concentrates employed in making up said compositions.

2. Description of the Prior Art

The nature and the preparation of the antibiotic complex A-3823 is taught and claimed in U.S. Pat. No. 3,501,568 issued Mar. 17, 1970, the teachings of which are herein incorporated by reference. The patent discloses the utility of the antibiotic complex in the treatment of coccidiosis. A product containing the A-3823 complex in the form of the sodium salt is being sold under the trademark Coban[R] (Trademark of the Elanco Manufacturing Company, Indianapolis, Indiana). The use of this same antibiotic for purposes of obtaining improved nutritional response is described in The Journal of Animal Science 39:259 (Abs.) 1974. This antibiotic when sold for this purpose is identified by the coined name monensin and by the trademark Rumensin[R] (Trademark of the Elanco Manufacturing Company, Indianapolis, Indiana). The A3823 complex is made up of factors A, B, C and D, with factors A and B together predominating to the extent of about 85-95 percent of the complex.

The free acid form of A3823 factor A is a crystalline compound having a melting point of about 103° to 105° C. The sodium salt has a melting point of about 267° to 269° C. The imperical formula of the free acid is $C_{36}H_{62}O_{11}$ and the molecular weight thereof is 670. The semi-structural formula of factor A is:

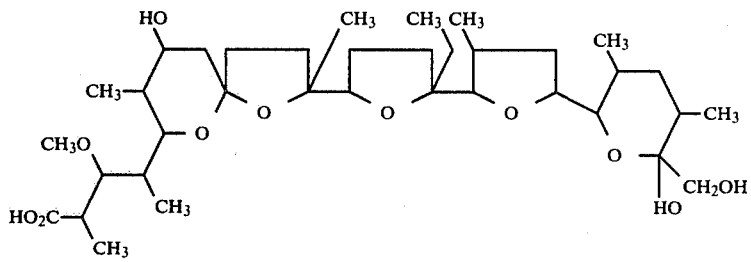

The sodium salt form of A3823 factor B has a melting point of about 227°-228° C. The molecular weight of the crystalline free acid is 656. The semi-structural formula is as follows:

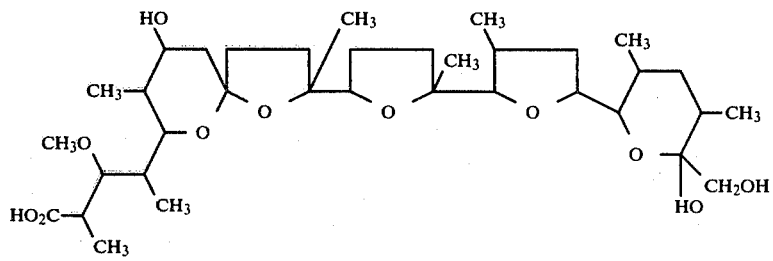

Factor C is a crystalline monocarboxylic acid having a molecular weight 684. The sodium salt melts at 212° to 214° C.

Factor D is also a crystalline compound containing a carboxylic acid group and having a molecular weight of 684. The sodium salt melts at 251° to 252° C.

The antibiotic A3823 complex is obtained by culturing a Streptomyces organism *Stroptomyces cinnamonensis* Okami (NRRL B1588) as represented by a permanent deposit with the American Type Culture Collection at Washington, D.C. that has been assigned the culture No. ATCC 15413.

The use of ronnel for the purpose of controlling parasites such as fleas, flies, lice, ticks, screw-worms and cattle grubs as well as the helminthic parasites such as lung worms, stomach worms and the gastrointestinal worms, attacking warm-blooded domestic animals is taught and claimed in U.S. Pat. No. 2,811,480 issued Oct. 29, 1957. The method of the patent comprehends the administration of the ronnel either topically or orally at a dosage rate in the range of about 50 to 175 milligrams per kilogram of body weight depending upon the phosphate ester selected and the parasite intended to be controlled. It is further taught that the treatment may be carried out in the form of multiple doses over a period of several days in which case a daily dosage of from about 5 to about 25 milligrams per kilogram of body weight may be employed. Furthermore, it is taught in the patent that domestic animals thus protected from the adverse effects of parasites exhibit improved growth characteristics. Ronnel has been sold and used for such parasiticidal purposes for some time.

Rather recently, feeding studies were carried out by the United States Department of Agriculture to determine ronnel tissue residues of steers that had been fed ronnel and activated carbon. The results of feeding steers 4.5 milligrams ronnel per kilogram of body weight daily for about 90 days is reported and described in Journal of Animal Science, Volume 40, No. 4, 1975 by T. S. Rumsey, E. E. Williams and A. D. Evans. Rumsey et al. report, among other things, both a parasiticide effect with respect to control of house and stable flies and also a growth promotant effect.

Both the Moorman Mfg. Company and The Dow Chemical Company have prepared and sold a ronnel-containing mineral supplement (feed additive) for cattle and sheep both in loose form and in block form. Such mineral supplements have contained from about 5.5 to about 6 percent by weight ronnel and are expected to provide the animals feeding therefrom at least 4 to 4.5 milligrams ronnel per kilogram of body weight per day.

The use of ronnel at a dosage rate below the parasiticidal level is taught and claimed in the prior filed co-pending application of Robert M. Ioset.

The use of bromophos as an insecticide is disclosed in U.S. Pat. No. 3,227,610 and Belgian Pat. No. 625,198 as described in CA 64, 8086a and CA 60, 13187a respectively.

The use of iodofenphos as an insecticide is disclosed in Netherlands Application No. 6,515,066 of May 23, 1966 as described in CA 65, 13762b,a.

SUMMARY OF THE INVENTION

It has now been discovered that upon feeding to livestock and poultry, ronnel or bromophos or iodofenphos or a mixture thereof in combination or concurrently with the antibiotic monensin, the depressed feed intake observed on monensin-containing diets is overcome and a highly desirable combination of rapid weight gain and feed conversion efficiency is obtained. As a consequence, improved nutritional response evidenced by one or more of more rapid weight gain and increased fiber production and/or milk production plus greater feed conversion efficiency is obtained on feeding an animal selected from a cloven hoof ruminant animal, a swine animal or a poultry animal the combination of respectively an effective amount in the range of from about 0.14 to about 2.3 milligrams of monensin and from about 0.5 to about 2.5 mg of ronnel, or bromophos or iodofenphos of a mixture thereof, per kilogram of body weight per day substantially daily for (a) at least about 28 days in the case of cloven hoof ruminant animals, (b) at least about 7 days in the case of swine, and (c) at least about 3 days in the case of poultry. More preferably administration of the growth promotants is continued at least about 56 days and most preferably for longer periods such as about 112 days or more in the case of the ruminants; more preferably at least about 25 days and most preferably at least about 60 days in the case of swine, and, preferably at least about 10 days, and more preferably at least about 25 days and most preferably at least about 60 days, in the case of poultry.

The antibiotic monensin and the phosphate ester selected are conveniently incorporated in a feed composition in appropriate amount to achieve the desired daily dosage of each in the amount of ration or supplement consumed regularly, generally about 5 to about 100 grams of monensin and about 3 to about 350 grams of phosphate ester per ton of balanced ration (dry matter basis, i.e., DM basis), depending on the age and type of animal. These two nutritional response additives may also be incorporated in a mineral, protein or energy-type feed additive supplement in an appropriate amount to provide the above-recited daily dosages in the amount of supplement the average animal is expected to consume each day on a daily basis. If desired, the monensin and the phosphate ester may be supplied separately in different feed mixes and fed alternately each day, but it is generally more convenient and the dosage consumed more accurate if the two nutritional response additives are blended in the same feed mix.

For commercial use, it is convenient to provide a feed additive premix or concentrate containing the phosphate ester and the monensin in a proportion such that a predetermined quantity of the premix to be added per ton of balanced ration DM basis, for example, from about 0.5 to about 1000 pounds of premix contains from about 5 to about 100 grams of monensin in addition to about 3 to about 200 grams of the phosphate ester. The feed additive premix or concentrate consists of the monensin and the phosphate ester and a carrier such as soybean meal or ground corn or other edible feed grade material or innocuous diluent suitable for the livestock or poultry animals at hand.

DETAILED DESCRIPTION OF THE INVENTION

The following glossary defines terms, for the purposes of the specification and the appended claims, in the main, in terminology promulgated by the Association of American Feed Control Officials.

The term "blocks" means agglomerated feed compressed into a solid mass cohesive enough to hold its form and weighing over two pounds, and generally weighing 30–50 pounds.

The terms "pellets" and "cubes" refer to agglomerated feed formed by compacting and forcing through die openings by a mechanical process and cutting the extrudate into appropriate short lengths. Cubes are made from feed forced through a square opening and cut into appropriate lengths. Pellets are generally made from feed forced through round or oval openings.

The term "carrier" refers to an edible material to which ingredients are added to facilitate uniform incorporation of such ingredients into feeds. The active ingredient is absorbed, impregnated or coated into or onto the edible material in such a way as to disperse and physically carry the active ingredient.

The term "commercial feed" means all materials which are distributed for use as feed or for mixing in feed, for animals other than man, except:

(1) Option A—unmixed seed, whole or processed, made directly from the entire seed; Option B—unmixed or unprocessed whole seeds;

(2) Hay, straw, stover, silage, cobs, husks and hulls (a) when unground, and (b) when unmixed with other materials;

(3) Individual chemical compounds when not mixed with other materials.

The term "concentrate" refers to a feed used with another to improve the nutritive balance of the total and intended to be further diluted and mixed to produce a supplement or a complete feed.

The terms "feed" and "feedstuff" each refer to one or more edible materials which are consumed by animals (here other than man) and contribute energy and/or nutrients to the animal's diet.

The term "diet" means a feed ingredient or mixture of ingredients including water, which is consumed by animals.

The phrase "feed additive premix" refers to an article that must be diluted for safe use in feed additive concentrate, a feed additive supplement or a complete feed. It contains, among other things, one or more additives in high concentrate in a suitable feed base such that up to 100 pounds must be diluted to produce 1 ton of complete feed. A feed additive premix contains additives at levels for which safety to the animal has not been demonstrated and/or which may result when fed undiluted in residues in the edible products from food producing animals in excess of the safe levels established.

The phrase "feed additive concentrate" refers to an article intended to be further diluted to produce a complete feed or a feed additive supplement and is throughout most of the range not suitable for offering as a supplement or for offering free choice without dilution. It contains, among other things, one or more additives in amounts in a suitable feed base such that from 100 to 1000 pounds of concentrate must be diluted to produce 1 ton of a complete feed. A "feed additive concentrate" is unsafe if fed free choice or as a supplement because of danger to the health of the animal or because of the production of residues in the edible products from food producing animals in excess of the safe levels established. (While the foregoing is an accepted standard definition, it will immediately be apparent to those skilled in the art that concentrates containing ronnel as set forth herein may be fed quite safely provided the carrier is consumed or restrictedly supplied at a rate to provide ronnel according to this invention which is so low as to be below the parasiticidal level.)

The phrase "feed additive supplement" refers to an article for the diet of an animal which contains one or more food additives and is intended to be (1) further diluted and mixed to produce a complete feed; or (2) fed undiluted as a supplement to other feeds; or (3) offered free choice with other parts of the rations separately available. A "feed additive supplement" is intended to be safe for the animal and to not produce unsafe residues in the edible products from food producing animals if fed according to directions.

By "free choice" is meant a feeding system by which animals are given unlimited access to the separate components or groups of components constituting the diet.

"Ration" means the amount of the total feed which is provided to one animal over a 24 hour period.

The term "premix" refers to a uniform mixture of one or more micro-ingredients with diluent and/or carrier. Premixes are used to facilitate uniform dispersion of the micro-ingredients in a larger mix.

The phrase "trace minerals" refers to mineral nutrients required by animals in micro amounts (measured in milligrams per pound or smaller units).

The term "vitamins" means organic compounds that function as parts of enzyme systems essential for the transmission of energy and the regulation of metabolisms of the body of an animal.

The term "phosphate ester" means ronnel, i.e., O,O-dimethyl,O-(2,4,5-trichlorophenyl)phosphorothioate, or bromophos, i.e., O,O,-dimethyl,O-(4-bromo-2,5-dichlorophenyl)phosphorothioate, or iodofenphos, also known as jodfenphos, i.e., O,O-dimethyl,O-(2,5-dichloro-4-iodophenyl)phosphorothioate, or a mixture of any two or more of ronnel, bromophos and iodofenphos.

The term "growth promotant combination" means the herein described combination of monensin and phosphate ester which actually promotes nutritional response and not just growth response.

Increasing the weight gain, wool production, the milk production in lactating animals, and feed conversion efficiency of livestock and poultry selected from the cloven hoof-ruminant animals, cattle and sheep, from swine, and from poultry, is an important objective of this invention. For example, immature sheep, cattle and swine are commonly fed for maximum growth rate in feedlots and poultry such as chickens and turkeys in broiler pens, until they reach a marketable weight. When the desired weight is achieved, the animal is sold for slaughter. There is a normal feed intake for most animals due to both physical and metabolic factors. It is important economically that the animals achieve market weight in as short a time as possible while consuming the least amount of feed necessary to achieve such gain.

It has been unexpectedly found that when phosphate ester such as ronnel is admixed with a monensin-containing feed as specified herein and administered to ruminant animals, swine and poultry they more readily eat the feed so that the depressed feed intake characteristic of the monensin-containing diet is overcome and as a consequence feed intake is improved, substantial rates of weight gain are observed while achieving suprising feed conversion efficiency results. On using monensin and phosphate ester in combination the average daily gain obtained as well as the feed conversion efficiency is much better than would be predicted from the characteristics of each nutritional response promotant administered alone, thus achieving synergistic results.

The practical effect of this invention is to bring ruminant animals such as sheep or cattle, swine, and poultry promptly to market weight with suprisingly reduced feed consumption, to obtain improved fiber (wool) production efficiency, and, in the case of lactating animals, greater milk production efficiency, when there is included in the diet, by way of the feed or feed additive supplement in the daily ration of such animals, substantially every day for at least the minimum periods recited above, the active ingredients or growth promotants, ronnel, or bromophos or iodofenphos, and monensin. The monensin and phosphate ester are most conveniently dispered uniformly throughout the normal feed or feed additive supplement of the subject animal being fed in effective dosage levels. While some of the benefits of each of monensin and phosphate ester may be obtained by feeding the two growth promotants simultaneously but in respectively different supplements or components of the daily diet, the depressed feed intake observed with monensin-containing diets is not overcome.

The increased feed conversion efficiency for any productive function, i.e. increased weight gain, increased fiber production, and increased milk production of ruminant animals, swine, and poultry, fed according to the invention is accomplished by feeding to the animal the components monensin and phosphate ester at the dosage rates and for the times indicated herein.

While the benefits of providing monensin and the phosphate ester together in the diet are generally not markedly noticeable, or at least not commercially significant, in cloven hoofed ruminants during a feeding period shorter than about 28 days, or 7 days in the case of swine, or 3 days in the case of poultry, the improvement in nutritional response continues to be increasingly evident as providing of the combination of monensin and phosphate ester continues for longer periods such as up to about 56 days and further, up to about 112 days or more in the case of cloven hoof ruminants, up to about 25 days and preferably at least 60 days in the case of swine, up to about 10 days, more preferably up to about 25 days and most preferably at least 60 days or more in the case of poultry. The shorter times are most significant with animals being finished for market. Occasional lapses of several days or more without provision of the growth promotant combination are not harmful to the animal but limit the beneficial effects largely to those days during which the growth promotants are supplied. Providing the combination of growth promotants during at least 75% and preferably at least 90% of the days throughout a feeding period is considered to be "substantially every day" with respect to the feeding of livestock and poultry according to the present method.

The monensin and phosphate ester can be mixed with conventional feed compositions. The feed compositions are then fed to the described livestock or poultry animals according to methods well known to the agricultural art. The use of the combination of monensin and phosphate ester is particularly advantageous when incorporated into the normal feeds of meat-producing animals, i.e., into growing and/or fattening ruminant, swine or chicken feeds. In the case of wool producing or lactating animals, the diet into which the combination of growth promotants is advantageously incorporated according to the invention may vary from a high production diet to simply a good maintenance diet as may be selected by the animal husbandman or poultryman.

The animal feeds most generally used in conjunction with the method of this invention are composed of various grain mixtures and/or roughage feeds such as hay, cottonseed hulls, rice hulls, silage or other high fiber feedstuffs commonly fed to meat, milk and/or wool-producing animals, especially in cattle or sheep feeds. The feeds for swine and poultry will consist primarily of various grain mixtures plus the usual additaments such as bran meal, cottonseed meal, tankage or alfalfa meals suitable for monogastric animals.

As indicated hereinabove, the amount of monensin added to all such feeds will be in the range of about 5 to about 100 grams and the amount of ronnel will be in the range of about 3 to about 350 grams per ton of feed DM basis, depending on the age and type of animal. Very young animals that have been weaned or young poultry one or a few days old will have a lower feed consumption. However, as the animal goes through a growth period to a fattening period, sometimes called finishing, the feed consumption gradually increases, but generally falls in proportion to body weight.

Following are tabulations of feed intake for various sizes and types of animals with accompanying computed ranges of monensin and ronnel requirements to be used in combination per ton of feed DM basis needed to provide the daily dosages set forth above. The average daily feed intake figures are from "Clinical And Diagnostic Veterinary Toxicology", 2nd ed., William B. Buck, Gary D. Oswaler and Gary A. Van Gelder, Kendall/Hunt Publishing Company, Dubuque, Iowa. In any of these cases bromophos or iodofenphos or a blend of either together or with ronnel may be substituted in equal amount by weight for the ronnel shown in the following tables.

| Body Wt. | | % Feed Intake/- Body Wt. | Ronnel in Feed Grams Per Ton Dosage (mg/kg) | | Monensin in Feed Grams Per Ton Dosage (mg/kg) | |
|---|---|---|---|---|---|---|
| lbs | kg | | 0.5 | 4 | 0.14 | 2.3 |
| Beef Cattle | | | | | | |
| 300 | 136 | 2.3 | 19.7 | 157.6 | 5.5 | 90.6 |
| 450 | 204 | 2.5 | 18.2 | 145.6 | 5.1 | 83.7 |
| 650 | 295 | 2.4 | 18.9 | 151.2 | 5.3 | 86.9 |
| 1000 | 454 | 2.1 | 21.6 | 172.8 | 6.1 | 99.4 |
| Lactating Cattle | | | | | | |
| 770 | 350 | 1.4 | 35 | 280.0 | 9.8 | 161.0 |
| 1760 | 800 | 1.2 | 40 | 320.0 | 11.2 | 184.0 |
| Non-Lactating Dairy Cattle | | | | | | |
| 770 | 350 | 1.8 | 33 | 264.0 | 9.2 | 151.8 |
| 1760 | 800 | 1.6 | 28 | 224.0 | 7.8 | 128.8 |
| Lambs | | | | | | |
| 59 | 27 | 4.5 | 10 | 80.0 | 2.8 | 46.0 |
| 99 | 45 | 3.9 | 11.6 | 92.8 | 3.3 | 53.4 |
| Swine | | | | | | |
| 10 | 4.5 | 8 | 5.7 | 45.6 | 1.8 | 26.2 |
| 50 | 22.7 | 6.4 | 7.1 | 56.8 | 2.0 | 32.7 |
| 100 | 45 | 5.3 | 8.6 | 68.8 | 2.4 | 39.6 |
| 150 | 68 | 4.5 | 10.1 | 80.8 | 2.8 | 46.5 |
| 200 | 90 | 4 | 11.4 | 91.2 | 3.2 | 52.4 |
| Chickens | | | | | | |
| 0.5 | 0.23 | 14 | 3.2 | 25.6 | 0.9 | 14.7 |
| 1 | .45 | 11.4 | 4 | 32.0 | 1.1 | 18.4 |
| 1.5 | .69 | 9.7 | 4.7 | 37.6 | 1.3 | 21.6 |
| 3.5 | 1.59 | 6.7 | 6.7 | 53.6 | 1.8 | 30.8 |
| 5.5 | 2.50 | 5.0 | 9.1 | 72.8 | 2.6 | 41.8 |

From the foregoing, it is apparent that cattle on a growing diet and weighing about 300 to about 1000 pounds will ordinarily be fed a diet, according to the invention, containing about 18 to about 173 grams ronnel or phosphate ester, per ton DM basis, and about 5 to about 100 grams monensin per ton DM basis, while cattle on a fattening diet will also be fed a feed containing from about 18 to about 173 grams phosphate ester per ton DM basis and from about 5 to about 100 grams monensin per ton DM basis. In each case, the concentrations will generally be somewhat higher for heavier animals. Ordinarily the preferred concentrations in feed for complete balanced feeder cattle rations will be about 64 to about 80 grams of phosphate ester and about 20 to about 30 grams of monensin per ton of ration, DM basis.

Maintenance diets fed lactating dairy cattle should contain from about 35 to about 320 grams phosphate ester and about 9 to about 184 grams monensin per ton DM basis, depending on the size and feed intake of animal, while non-lactating dairy cattle should receive a feed containing about 28 to about 264 grams phosphate ester and about 7 to about 152 grams monensin per ton DM basis.

Lambs on dry feed will generally be fed a ration containing about 10 to about 93 grams phosphate ester and about 2 to about 54 grams monensin per ton DM basis. Grower pigs may be fed a ration containing about 5 to about 92 grams phosphate ester and about 1 to about 53 grams monensin per ton DM basis while swine in the fattening stage will also generally be supplied a ration containing about 5 to about 92 grams phosphate ester and about 1 to about 53 grams monensin per ton DM basis.

Poultry such as very small day old or older birds up through starter or grower stage will generally be fed a complete ration or mash containing about 3 to about 73 grams phosphate ester and about 0.9 to about 42 grams monensin per ton DM basis while poultry on a fattening diet will feed on a ratio containing about 3 to about 73 grams phosphate ester and about 0.9 to about 42 grams monensin per ton DM basis.

In any event, in any specific feeding operation, the actual concentrations of monensin and phosphate ester will provide daily from about 0.14 to about 3 mg monensin and from about 0.5 to about 4 mg ronnel per kg of body weight in the feed consumed on average by the animals eating the feed.

For commercial use, the monensin and ronnel are most readily and conveniently used as a feed additive premix or feed additive concentrate formulation in which the growth promotants are distributed uniformly throughout a standard organic or inorganic animal feed carrier in a concentrated form which is conveniently packaged and shipped to the feed mixer. This premix or concentrate is then in turn mixed uniformly with a normal diet for the animal as desired by the grower or the feed mixer. Examples of carriers for premix compositions are soybean meal, corn oil, ground corn, barley, wheat, mineral mixtures containing, e.g., vermiculite or diatomaceous earth, corn gluten meal, corn distillers solubles, soy flour or other modestly priced edible ingredients. The active ingredient will be in amounts to satisfy the criteria set forth above for balanced feed rations.

In the case of feed additive premix, a preselected unit quantity thereof in the range of about 0.5 to about 100 pounds will contain a preselected quantity of each of monensin and phosphate ester in one of the ranges set forth for each above, depending on the animals to be fed and will be suited to mix with the final feed or diet at the rate of one unit quantity per ton of feed.

In the case of feed additive concentrate, a preselected unit quantity in the range of about 100 to about 1000 pounds will likewise contain a preselected quantity of phosphate ester in one of the ranges set forth above for each of the growth promotants and will be suited to mix with the final feed or diet at the rate of one unit quantity per ton of feed.

The growth promotants may also be admixed with a suitable carrier such as an edible feed or feed component in the form of a feed additive supplement as that is defined hereinabove. Such a supplement may contain about 0.1 to about 10 percent by weight DM basis phosphate ester and about 0.04 to about 5 percent by weight DM basis monensin. If to be fed free choice or as a supplement, the phosphate ester and monensin concentrations are provided according to the anticipated daily consumption of the supplement to provide a daily dose of each of the promotants in one of the ranges specified herein.

Such a feed additive supplement, if to be used as a supplement, may be a mineral, protein or energy supplement in the form of a liquid, compressed or dry granular composition which can be free choice or self fed to animals grazing pasture, range or crop residue land, or, feeding from a ground feed or mash which does not contain a balanced diet and includes neither phosphate ester nor monensin, the concentration of these growth promotants provided being such as to provide a daily dose of each of monensin and phosphate ester in the range set forth above as the practice of the invention, in the amount of supplement consumed substantially every day per average animal in a given group being fed.

The animal diets may also contain hay, straw, silage, cornstalks, cottonseed hulls, oats, barley and cereal brans, particularly for the ruminants; natural oils such as animal fat or cattle, fish oils, safflower oil, peanut oil, and cotton seed oil; antioxidants, minerals, vitamins, antibiotics, anthelmintics; and other appropriate medicaments.

Examples of typically prepared ruminant animal feeds are as follows:

EXAMPLE 1

| Ingredients | Weight Percent (D.M. Basis) |
| --- | --- |
| Mixed Hay | 40.0 |
| Ground Yellow Corn | 45.0 |
| Soybean Oil Meal | 7.0 |
| Cane Molasses | 7.0 |
| Dicalcium Phosphate | 0.5 |
| Trace Mineral Salt | 0.5 |
| Vitamin A | 300 IU/lb |
| Vitamin D | 150 IU/lb |
| Ronnel | 18 to 173 grams/ton of feed |
| Monensin | 5 to 100 grams/ton of feed |

Such a feed typically contains 8 to about 15 percent by weight moisture.

EXAMPLE 2

| Ingredients | Weight Percent (D.M. Basis) |
| --- | --- |
| Ground Shelled Corn | 65.85 |
| Mixed Ground Hay | 20.0 |
| Dried Molasses | 6.00 |
| Soybean Meal | 6.00 |
| Ronnel | 18 to 173 grams/ton of feed |
| Monensin | 5 to 100 grams/ton of feed |
| Trace Mineral Salt | 0.50 |
| Dicalcium Phosphate | 0.40 |
| Ground Limestone | 0.70 |
| Vitamin A (30,000 units/gms) | 66.7 grams/ton |
| Vitamin $D_2$ (16,000,000 units/lb) | 7.1 grams/ton |

Such a feed typically contains about 8 to about 15 percent by weight moisture.

EXAMPLE 3

An example of a suitable feed additive premix is as follows:

| | |
|---|---|
| Ronnel | 64 grams |
| Monensin | 30 grams |
| Ground Yellow Corn (5–10% moisture) | 360 grams |

EXAMPLE 4

For use in the field for animals on range, the monensin and ronnel combination may be administered by means of salt or molasses blocks. A typical block may be prepared using the following compositions:

| Ingredients | Weight Percent (D.M. Basis) |
|---|---|
| Dried Cane Molasses | 30.2 |
| Ground Soybean Hulls | 29.6 |
| Ronnel | 6 |
| Monensin | 4.8 |
| Granulated Salt | 25.9 |
| Trace Minerals and Vitamins | 0.24 |
| Stabilized Animal Fat | 1.3 |
| Moisture | 2.6 |

EXAMPLE 5

If desired, monensin and ronnel together may be administered as a part of a liquid animal feed supplement such as a supplement containing a nonprotein nitrogen source such as urea in admixture with molasses and other feed ingredients. Such a liquid supplement may be prepared using the following conditions:

| Ingredients | Weight Percent (D.M. Basis) |
|---|---|
| Molasses | 79.90 |
| Water | 13.55 |
| Phosphoric Acid, 85% | 2.70 |
| Ammonium Sulfate | 2.00 |
| Trace Minerals | .50 |
| Vitamin A, D & E | .05 |
| Salt | 1.00 |
| Ronnel | .20 |
| Monensin | .10 |
| | 100.00% |

In any of the foregoing tables and discussion bromophos or iodofenphos or a blend of any combination of two or more of ronnel, bromophos or iodofenphos may be substituted for ronnel on an equal weight or weight percent basis.

EXAMPLE 6

The following example demonstrates the marked improvement in feed intake on combining ronnel and monensin in the diet as well as showing the further increase in average daily gain over ronnel administered alone and the further increase in feed conversion efficiency over monensin along on feeding the combination to beef cattle.

24 Angus X Hereford Cross Heifers weighing approximately 415 pounds each were ear-tagged, weighed, and treated for grubs and helminths. These animals were then allotted to treatment groups of 6 animals each and placed into individual feeding pens. Feed was offered to the cattle at maximum ad libitum intake on a daily basis. All discarded feed was weighed on a succeeding day post-feeding, recorded, and then discarded. Water was supplied ad libitum. Health and care were under the supervision of qualified personnel. All pens were washed on a daily basis.

Animals were weighed to the nearest pound at 28 day intervals. Weight gain, feed conversion, and feed intake data were calculated at each interval or until the experiment was terminated 111 days after initiation.

All the animals were fed the following basal diet consisting of:

| Ingredients | Weight Percent (D.M. Basis) |
|---|---|
| Cottonseed Hulls | 30.00 |
| Ground Corn | 40.40 |
| Alfalfa Meal | 12.70 |
| Soybean Oil Meal | 10.00 |
| Molasses | 5.25 |
| Salt | 0.50 |
| Calcium Carbonate | 0.40 |
| Sodium Tripolyphosphate | 0.25 |
| Magnesium Oxide | 0.30 |
| Vitamins and Trace Minerals | 0.20 |
| | 100.00% |

A comparison group of animals was fed the basal diet having admixed therewith 30 grams monensin per ton of feed DM basis. A second comparison group was fed the basal diet having admixed therewith 80 grams per ton ronnel DM basis. A third group of 6 animals was fed according to the invention, the said basal diet having admixed therewith 30 grams per ton of monensin and 80 grams per ton ronnel DM basis. The fourth group of 6 animals served as controls and received the basal diet without further additions. The results of the feeding study are tabulated as follows:

TABLE I

The Efficacy of Monensin, Ronnel, and Monensin-Ronnel Combination On Weight Gains and Feed Conversions of Cattle

| Item | Group 1 Monensin 30 gms/ ton feed (1 mg/kg body wt) | Group 2 Ronnel 80 gms/ ton feed (2 mg/kg body wt) | Group 3 30 gms Monensin + 80 gms Ronnel/- ton Feed (3 mg/kg) | Group 4 Control |
|---|---|---|---|---|
| Average Daily Gain (lb) | 2.33 | 2.50* | 2.66 | 2.39 |
| Average Feed/ Gain Ratio | 7.36 | 7.66* | 6.99 | 7.68 |

*Average results for 5 heifers, the sixth having given anomalous results. Groups 1, 2, and 4 were studied as comparisons.

The results listed for the comparisons in group 2 are based on data from just 5 animals, the 6th animal having given clearly spurious and anomalous results.

The data in the table demonstrate that the addition of monensin and ronnel in combination improve average daily gain by 11.1 percent when compared to the controls. The improvement is almost 14.2 percent when compared to monensin alone and 6.4 percent when compared to ronnel alone. Similar improvements are noted for the improvement in feed conversions.

EXAMPLE 7

100 English Hereford and Hereford-Angus cross steers weighing about 450 pounds (204.5 kg) each were ear-tagged, weighed and treated with TBZ brand thiabendozole to eliminate grubs and helminths. These animals were then allotted to treatment groups of 5 animals each and placed in respective group pens. Feed was offered to the cattle at maximum ad libitum intake on a daily basis. Once each day uneaten feed was weighed, the weight recorded, and the feed discarded. Water was supplied ad libitum. Health and care were under the supervision of qualified personnel. All pens were washed on a daily basis.

Animals were weighed to the nearest pound at 28-day intervals and weight gain, feed conversion and feed intake data were calculated at each interval.

All the animals were fed a basal diet consisting of corn silage blended with a ground corn mix containing, by weight, about 82% ground corn, about 15% cottonseed meal and minor amounts of dicalcium phosphate, calcium carbonate, sodium chloride and vitamin A. Initially the animals were fed a blend containing about 80% silage and the balance the ground corn mix. These proportions were gradually adjusted during an 84-day period until the animals were on a finishing diet containing about 20% silage and the balance the ground corn mix.

One group of 20 animals, five per pen, was fed according to the invention, the basal diet having admixed therewith sufficient monensin and ronnel to provide 1 mg/kg and 2 mg/kg of body weight, respectively, the proportions to the feed being adjusted periodically as consumption of feed increased and also as the animals gained weight. The amounts, however, were approximately 30 grams of monensin and 64 grams of ronnel per ton of feed. A second group of 20 animals was fed according to the invention receiving the same proportions of growth promotants as the first group. These animals, however, had received a Synovex S hormonal implant before the feeding trial began. A third group of 20 animals was fed the basal diet containing 30 grams monensin per ton of feed. A fourth group of 20 animals was fed the basal diet containing sufficient ronnel to provide about 2 mg ronnel/kg of body weight or approximately 64 grams of ronnel per ton of feed. All feed proportions are to be understood to be on a DM basis.

The fifth group of 20 animals as controls and received the basal diet without further additions. The results of the feeding study are tabulated as follows, the data showing both overall and finishing period experience:

TABLE II

| | GROUP FEEDING TRIAL | | | | | |
|---|---|---|---|---|---|---|
| | 5 Steers/pen Feed Consumption, DM Basis, Lbs. | | 4 Pens/ treatment Average Daily Gain, Lbs. | | Feed/Gain Ratio | |
| | 0-84 Days | 56-84 Days | 0-84 Days | 56-84 Days | 0-84 Days | 56-84 Days |
| Control | 16.19 | 17.81 | 2.35 | 2.65 | 6.89 | 6.72 |
| Comparisons | | | | | | |
| Ronnel 2 mg/kg | 17.02 | 19.79 | 2.46 | 2.78 | 6.92 | 7.12 |
| Monensin 30 g/ton | 14.64 | 16.13 | 2.40 | 2.67 | 6.10 | 6.04 |
| Tests per invention | | | | | | |
| Ronnel 2 mg/kg + Monensin 30 g/ton | 14.30 | 16.47 | 2.47 | 2.85 | 5.79 | 5.78 |
| Ronnel 2 mg/kg + Monensin 30 g/ton + Synovex S | 14.76 | 17.03 | 2.65 | 3.02 | 5.57 | 5.64 |

EXAMPLE 8

Seventy-five head of uniform, choice quality Hereford heifers averaging 579 pounds from the same source of native pasture were individually examined, branded, vaccinated against common feedlot diseases, injected with vitamin A (one million IU), and treated with a non-phosphate ester grubicide. The animals were maintained in a common pen under common conditions for 25 days. The animals were then weighed individually and allotted treatments for comparison on most significant basis. The animals were individually housed and fed throughout a 92-day feeding trial and weighed at the conclusion thereof. Respective groups of 6 animals received, throughout, on a daily basis, a balanced ration to which was added, respectively, ronnel and monensin as follows:

| | Drug Level g/ton | |
|---|---|---|
| | Ronnel | Monensin |
| Comparison | 0 | 0 |
| " | 64 | 0 |
| " | 0 | 30 |
| Tests | 32 | 30 |
| " | 64 | 20 |
| " | 64 | 30 |
| " | 64 | 40 |
| " | 96 | 10 |
| " | 96 | 30 |
| " | 96 | 40 |

In addition half of each group, i.e., 3 heifers, received a Synovex-H hormonal implant at the outset of the feeding trial. At the conclusion of the feeding trials and at intervals during the running of the feeding trials the animals were weighed and from recorded data on feed consumed computations were made of average daily gain, average daily feed consumption and feed conversion efficiency.

Due to the very small sample per treatment under each set of conditions differences in performance were not clear cut. Furthermore, the test was run under unusually warm weather conditions. Treatment with monensin without ronnel and vice versa tended to show no improvement over controls receiving neither, whether or not implanted with Synovex-H implant, although previous tests using a larger number of test animals per treatment has shown otherwise for ronnel alone and monensin alone.

However, on a statistical basis, animals receiving most any of the combinations of ronnel and monensin listed above appeared to show a better nutritional response, whether or not they had also received the hormonal implant.

EXAMPLE 9

In the following chick feeding experiment, monensin and ronnel are added in combination to the following rye grain basal diet which is illustrative of poultry diets for broilers, i.e. rapidly growing birds for meat production.

| Ingredient | Weight Percent |
|---|---|
| Rye Grain | 55.00 |
| Soybean meal | 27.00 |
| Herring Fishmeal | 5.00 |
| Meat and Bone | 5.00 |
| Dried Whey | 1.00 |
| Dehydrated Alfalfa | 1.25 |
| Salt | 0.22 |
| Animal Fat | 4.00 |
| Dicalcium Phosphate | 0.50 |

| Ingredient | Weight Percent |
| --- | --- |
| Ground Limestone | 0.67 |
| Vitamin Premix | 0.25 |
| Trace Mineral Premix | 0.05 |
| dl Methionine | 0.06 |

This diet without modification was fed to a control group of 12 broiler-type day-old chicks. Another group of 12 broiler-type day-old chicks were fed, according to the invention, the above listed diet which had admixed therewith the combination of 50 grams ronnel and 100 grams monensin per ton of feed DM basis. The chicks were individually weighed and were fed for a total of 11 days. Feed and water were supplied ad libitum. Normal care and management of the facilities were observed. At the termination of the 11 day trial period, the birds were each individually weighed and the following data were calculated:

TABLE III

The Efficacy of Ronnel-Rumensin Combination On Average Bird Gain And Feed Conversion Improvement of Chicken

| Item | 50 gms Ronnel + 100 gms Monensin/Ton of Feed | Control |
| --- | --- | --- |
| Average Bird Weight Gain (gms) | 13.79 | 13.01 |
| Feed/Gain Ratio | 1.35 | 1.46 |

When compared to the controls, the chicks fed according to the invention were 5.7 percent heavier and consumed and 7.6 percent less feed to accomplish the heavier gain.

Upon repeating the foregoing chick feeding experiment utilizing the same type and age of chicks fed the diet set forth and feeding one group of 12 chicks the ration containing 50 grams of ronnel per ton of feed and another group of 12 chicks the ration containing 100 grams of monensin per ton of feed by way of comparison, the chicks fed ration containing ronnel have gained weight faster than the controls referred to above and at a greater feed efficiency. The chicks fed ration containing monensin have gained weight somewhat faster than the controls and at noticebly greater feed efficiency. The weight gain is less than that shown with ronnel and the feed utilization is greater. The feed gain shown above for chicks fed the present combination is greater than would be predicted from the results of feeding the individual phosphate ester and monensin components separately. Likewise, the feed utilization efficiency set forth in the table above is a smaller value than would be predicted if ronnel and monensin produced only additive effects.

The effects upon chickens and other fowl are made more complex of interpretation because of the pervasiveness of coccidia and the utilization of at least a portion of any antibiotic in the diet to combat such infection.

EXAMPLE 10

In a feeding trial in which chicks similar to the above were fed a similar mash feed, respective groups of 120 chicks each divided into 4 pens each with 15 males and 15 females per pen, were fed portions of the mash feed to which were added 110 g/ton monensin, and respectively:

| Additive(s) | g/ton |
| --- | --- |
| 1. — | — |
| 2. bacitracin MD | 10 |
| 3. ronnel | 6.25 |
| 4. ronnel | 12.5 |
| 5. ronnel | 25 |
| 6. ronnel | 50 |
| 7. ronnel | 100 |
| 8. ronnel | 200 |
| 9. ronnel | 500 |

One additional group was fed mash to which 50 g/ton bacitracin MD had been added.

The feeding trial extended over a period of 7 weeks. The chicks were individually weighed before and after the feeding trial. The chicks fed the combination according to the invention gained weight more efficiently than those fed bacitracin alone or in combination with monensin. When compared to those fed monensin alone the the results of this particular test were anamolous but showed an improved performance at all but one dosage level. These results are not believed to be representative wherein synergism is not demonstrated.

While the maximum benefit of the method of the invention is obtained in feeding the combination of monensin and phosphate ester throughout the feeding cycle, swine benefit noticeably from feeding ronnel for a period of as short as about 7 days, particularly during finishing, a minimum period of about 25 days is more preferred, and a period of at least about 60 days is most preferred.

Similarly, poultry, including chickens, turkeys, ducks, geese and other domestic fowl, benefit noticeably from feeding the combination of monensin and phosphate ester according to the invention for a period as short as about 3 days, particularly during finishing just before marketing. A minimum period of about 10 days is more preferred, at least 25 days is further desired, and at least about 60 days is the most advantageous.

While the amounts of monensin and phosphate ester to be employed according to the invention have been set forth hereinabove in broad ranges it is more preferred to utilize monensin, in the combination, in a dosage range of about 0.5 to about 1.2 mg/kg body weight and most preferably from about 0.7 to 1 mg/kg of body weight. In the combination it is also more preferred to use phosphate ester in the dosage range of about 1 to about 3 mg/kg of body weight and most preferred to use about 2 to about 2.5 mg/kg of body weight.

Although phosphate ester is highly useful in the combination in increasing the feed intake of feed compositions containing monensin especially at high levels, where the effect is most marked, it is nonetheless preferred to administer to animals according to the invention about 0.7 to 1 mg monensin and about 2 to about 2.5 mg phosphate ester per kg of body weight per day.

The O-(2,4,5-trichlorophenyl) O,O-dimethyl phosphorothioate as herein employed may be prepared by reacting two molecular proportions of sodium methylate with one molecular proportion of O-(2,4,5-trichlorophenyl)phosphorodichloridothioate. In such operations, the alcoholate is added at a temperature of from 30° to 80° C. to the phosphorodichloridothioate reagent dispersed in a solvent such as benzene. Following the reaction, the product is separated in a conventional manner. Bromophos and iodofenphos are similarly prepared from the requisite phosphorodichloridothioate.

A further advantage of the present invention is that it may be practiced upon beef cattle, i.e., cattle on a fattening diet, which have received an estrogenic type hormone implant with the expected benefits of the implant and of the present invention being normally independently achieved in an additive or beneficial manner. Among the typical products implanted are Synovex-H, a mixture of testosterone propionate and estradiol benzoate; MGA, melengesterol acetate form of progestin; Synovex S, a mixture of progesterone, i.e., progestin, and, estradiol benzoate; and stilbesterol, the estrogen being selected appropriately for the sex of the animal to be implanted.

In view of the apparent universality of the nutritional response obtained with the present combination in monogastric as well as ruminant animals a fair measure of the results and benefits of the combination is obtainable by performing feeding studies upon laboratory rats.

We claim:

1. The method of promoting nutritional responses of an animal selected from the group consisting of feeder cattle and poultry which comprises: introducing into the diet of an animal of the designated class in combination about 1 mg of monensin and about 2 mg of a phosphate ester per kilogram of body weight per day substantially over a period of at least about 28 days in the case of feeder cattle and at least 3 days in the case of poultry, said phosphate ester being selected from the group consisting of ronnel, bromophos and iodofenphos.

2. The method as in claim 1 wherein the animal is a member of the feeder cattle class.

3. The method as in claim 1 wherein the animal is a member of the poultry class.

4. The method as in claim 1 carried out over a period of at least 56 days in the case of feeder cattle.

5. The method of claim 1 carried out over a period of at least 112 days in the case of feeder cattle.

6. The method of claim 1 carried out over a period of at least about 25 days in the case of poultry.

7. The method of claim 1 carried out over a period of at least about 60 days in the case of poultry.

8. The method of claim 1 wherein the combination of said monensin and phosphate ester is incorporated in intimate admixture with the feed of feeder cattle or poultry.

9. The method of claim 1 wherein the phosphate ester is ronnel.

10. The method of claim 2 wherein the phosphate ester is ronnel.

11. An improved feed composition for feeder cattle comprising about 30 grams of monensin and from about 64 to about 80 grams of phosphate ester per ton dry matter basis and the balance grower cattle feed, the phosphate ester being selected from the group consisting of ronnel, bromophos and iodofenphos.

12. The composition as in claim 11 wherein the phosphate ester is ronnel.

13. An improved feed composition for feeder cattle comprising about 30 grams of monensin and from 64 to about 80 grams of phosphate ester per ton dry matter basis and the balance fattening cattle feed, the phosphate ester being selected from the group consisting of ronnel, bromophos and iodofenphos.

14. The composition as in claim 13 wherein the phosphate ester is ronnel.

15. A feed additive premix composition for the preparation of a growth promotant feed composition which comprises about 0.08 to about 8 percent by weight of monensin and from about 0.25 to about 25 percent by weight phosphate ester and the balance an organic or inorganic feed carrier, the phosphate ester being selected from the group consisting of ronnel, bromophos and iodofenphos.

16. The composition of claim 15 wherein the phosphate ester is ronnel.

17. An improved poultry feed composition comprisng about 100 grams of monensin, from 6.25 to about 100 grams of phosphate ester per ton dry matter basis and the balance a substantially complete and balanced poultry starter feed composition, the phosphate ester being selected from the group consisting of ronnel, bromophos and iodofenphos.

18. The composition of claim 17 wherein the phosphate ester is ronnel.

19. An improved poultry feed composition comprising about 100 grams of mononsin, from 6.25 to about 100 grams of phosphate ester per ton dry matter basis and the balance a substantially complete and balanced poultry fattening feed composition, the phosphate ester being selected from the group consisting of ronnel, bromophos, and iodofenphos.

20. The composition of claim 19 wherein the phosphate ester is ronnel.

* * * * *

UNITED STATES PATENT AND TRADEMARK OFFICE
CERTIFICATE OF CORRECTION

PATENT NO. : 4,258,031

DATED : March 24, 1981

INVENTOR(S) : James T. Tollett et al

It is certified that error appears in the above-identified patent and that said Letters Patent are hereby corrected as shown below:

Col. 6, line 66, "dispered" should read -- dispersed --.

Col. 11, line 61, "along" should read -- alone --.

Col. 13, line 43, should read, The fifth group of 20 animals served as controls and received.

Col. 14, line 18, in the table "comparison" should read -- comparisons --.

Col. 15, line 33, "and" should read -- the --.

Col. 18, line 32, "comprisng" should read -- comprising --.

Signed and Sealed this

First Day of September 1981

[SEAL]

Attest:

Attesting Officer

GERALD J. MOSSINGHOFF

Commissioner of Patents and Trademarks